United States Patent [19]
Bennett et al.

[11] Patent Number: 5,346,045
[45] Date of Patent: Sep. 13, 1994

[54] ELECTRICALLY POWERED ACTUATOR

[75] Inventors: George R. Bennett, Findon; Terence F. H. Faithfull, Cranleigh, both of United Kingdom

[73] Assignee: Link-Miles Limited, United Kingdom

[21] Appl. No.: 1,343

[22] Filed: Jan. 7, 1993

[30] Foreign Application Priority Data

Jan. 9, 1992 [GB] United Kingdom ............ 00424

[51] Int. Cl.$^5$ ............................................. F16D 71/00
[52] U.S. Cl. .................................. 192/141; 74/89.15; 192/143
[58] Field of Search ............... 192/141, 140, 143, 149, 192/7; 74/89.15

[56] References Cited

U.S. PATENT DOCUMENTS

| Re. 25,659 | 10/1964 | Chapman et al. | |
|---|---|---|---|
| 1,677,108 | 7/1928 | Johnson | 192/140 |
| 3,207,005 | 9/1965 | Geyer | 192/7 X |
| 4,064,981 | 12/1977 | House et al. | 74/89.15 |
| 4,635,491 | 1/1987 | Yamano et al. | 74/89.15 |
| 4,712,441 | 12/1987 | Abraham | 74/89.15 |
| 4,721,196 | 1/1988 | Layer et al. | 192/141 |

FOREIGN PATENT DOCUMENTS

| 1114856 | 12/1981 | Canada. |
| 0137050 | 4/1985 | European Pat. Off. . |
| 0287860 | 10/1988 | European Pat. Off. . |
| 2238691 | 3/1973 | Fed. Rep. of Germany . |
| 59-925542 | 2/1984 | Japan . |
| 0674687 | 6/1952 | United Kingdom . |
| 0733840 | 7/1955 | United Kingdom . |
| 0743896 | 1/1956 | United Kingdom . |
| 1079752 | 8/1967 | United Kingdom . |
| 1316580 | 5/1973 | United Kingdom . |
| 1333908 | 10/1973 | United Kingdom . |
| 1384133 | 2/1975 | United Kingdom . |

OTHER PUBLICATIONS

Rolaram Leaflet; Fortune Engineering Systems; Glasgow, Scotland (2p).
Ransey Silent Inverted Tooth Chain catalog; Huddersfield, England (12p).
Spiracon Roller Screw Leaflet; Fortune Engineering Systems, Blantyre, Scotland (2p).
Industrial Shock Absorbers Catalog, Ace Controls, Inc., Farmington, MI (12p).

*Primary Examiner*—Rodney H. Bonck
*Attorney, Agent, or Firm*—Ostrolenk, Faber, Gerb & Soffen

[57] ABSTRACT

A linear actuator has reversible electric motors driving a screw-threaded shaft engaging a roller nut. A tubular housing attached to the nut has at its remote end an internal seating member and load securing lugs. An hydraulic shock absorber unit, providing linear deceleration, is normally held in its most relaxed condition between the seating member and an end of a spacer tube butting against the nut. When the nut is within the shock absorber stroke distance of the driven end of the shaft, the free end of the shaft compresses the shock absorber unit against the seating. When the nut is within shock absorber stroke distance of the free end of the shaft, a ring engages a stop collar, thereby holding the shock absorber body at a fixed distance from the free end of the shaft, and the spacer tube compresses the shock absorber unit. A centrifugal brake is provided on a drive coupling pulley, and restrains rotation of the shaft above a predetermined rate.

35 Claims, 5 Drawing Sheets

ELECTRICALLY POWERED ACTUATOR

BACKGROUND OF THE INVENTION

This invention relates to an electrically powered actuator of the type which includes a bidirectional electrically powered drive member a driven member coupled to the electrically powered drive member to be driven thereby, and a travelling member engaged with the driven member so as to be displaceable in opposite directions relative to the driven member between limits of displacement and in accordance with direction of drive of the drive member.

A known electrically powered actuator of the type described above is manufactured by Fortune Engineering Limited of Blantyre, Glasgow G72 9BR, Scotland, and marketed under the trade mark Rolaram.

An application in which it is desirable to use an electrically powered actuator is in a device for supporting and moving the cabin of a vehicle simulator such as a flight simulator. However, because the total moving weight in such an application may be as much as 17,000 kilograms and may be supported by six actuators to give six degrees of freedom, it is essential that the device for supporting and moving the weight be safe in the event of an electrical supply failure or cutting off of the supply to the electrically powered drive member.

SUMMARY OF THE INVENTION

According to the present invention, an electrically powered actuator of the type defined above is provided with a shock absorber unit disposed and coupled relative to the driven and travelling members so as to gradually slow down displacement of the travelling member relative to the driven member at the approach of the travelling member to each limit of displacement of the travelling member relative to the driven member, and with a centrifugal fugal braking member for selectively restraining the driven member.

Furthermore, in a preferred embodiment of the invention, in operation, the driven member is rotated by the drive member, and the centrifugal braking member is coupled to the driven member so as to restrain rotation of the driven member above a predetermined rate of rotation thereof. It should be noted that the centrifugal braking member operates regardless of the direction of the rotation of the driven member.

DETAILED DESCRIPTION OF PREFERRED EMBODIMENTS

Figure 1:
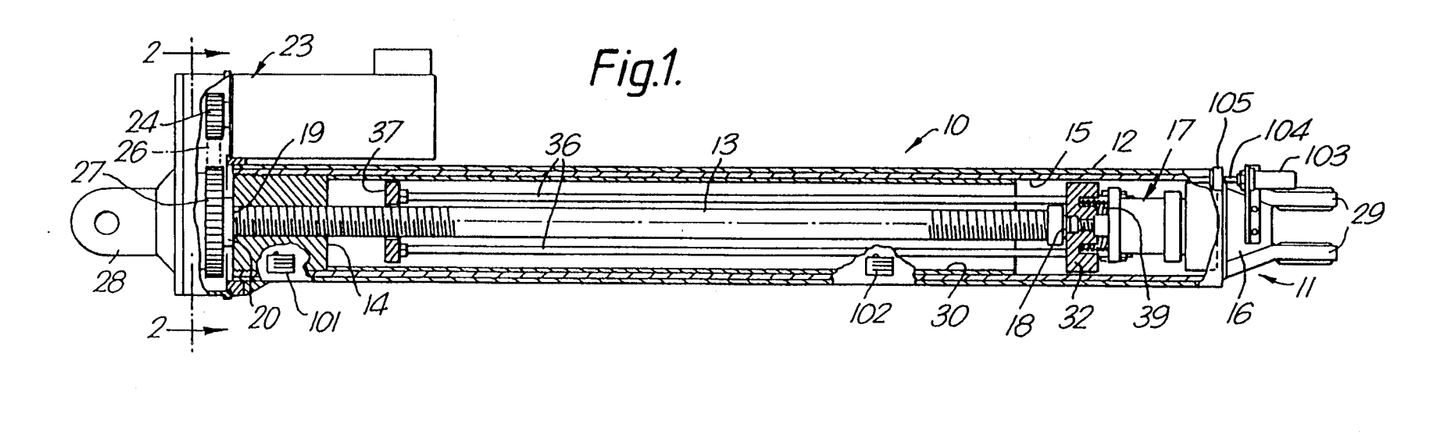
FIG. 1 is a side view of an electrically powered actuator which is a preferred embodiment of the invention, in which a travelling member is shown in partial axial section.

FIG. 1 shows an electrically powered linear actuator 10, which embodies the invention, with a travelling member 11 fully retracted into a tubular housing 12 coaxially disposed about a driven member in the form of a screw-threaded shaft 13. The travelling member 11 includes a nut 14 engaged with the thread of the shaft 13 and fixed, by screw thread engagement, in one end of a tubular member 15 providing a fixing seating 16 at its other end for a shock absorber unit 17. The shock absorber unit 17 is disposed to be compressed between one end 18 of the shaft 13 and the fixed seating 16 when the nut 14 is within less than a predetermined distance from the other end 19 of the shaft 13. In the fully retracted condition shown in FIG. 1, the travelling member 11 is at one limit of its range of translation relative to the shaft 13, the nut 14 being in contact with a fixed collar 20 at the end 19 of the shaft 13, and consequently the shock absorber unit is substantially fully compressed between the shaft end 18 and the seating 16.

Figure 2:
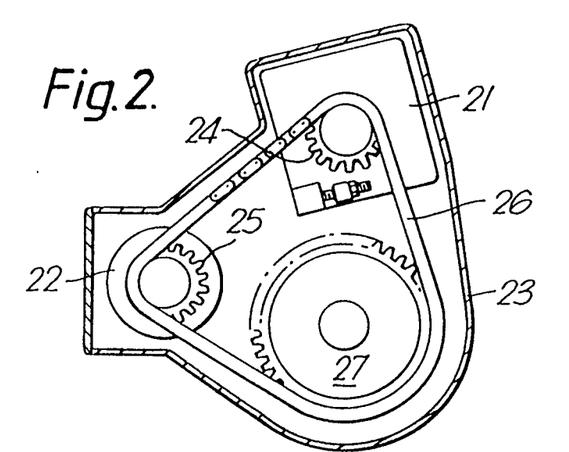
FIG. 2 is a cross-sectional view of a coupling between a drive member and a driven member in the embodiment of FIG. 1.

The device means for driving the shaft 13 includes a pair of reversible electric motors 21 and 22 shown in FIG. 2. The motors 21 and 22 are mounted in a housing 23 fixed to an end of the tubular housing 12 as shown in FIG. 1. The motors 21 and 22 have on their drive shafts respective drive pinions 24 and 25 which engage a silent chain 26 which also drivingly engages a toothed pulley 27 secured to the end of the shaft 13 by the collar 20. The silent chain 26 may be a silent inverted tooth chain manufactured by Ramsey Silent Chain Co., Ltd., of Commercial Road, Skelmanthorpe, Huddersfield, West Yorkshire, HD8 9DT, England. Alternatively, a gear train coupling the motor pinions 24 and 25 to the toothed pulley 27 may be used instead of the chain 26.

The housing 23 has securing lugs 28 for securing the housing 23, and hence the shaft 13, to a supporting structure such as a mounting plate (not shown) in a floor, and the tubular member 15 has securing lugs 29, at the end with the seating 16, for securing the tubular member 15, and thus the whole travelling member 11, to a body to be supported and moved.

Figure 3:
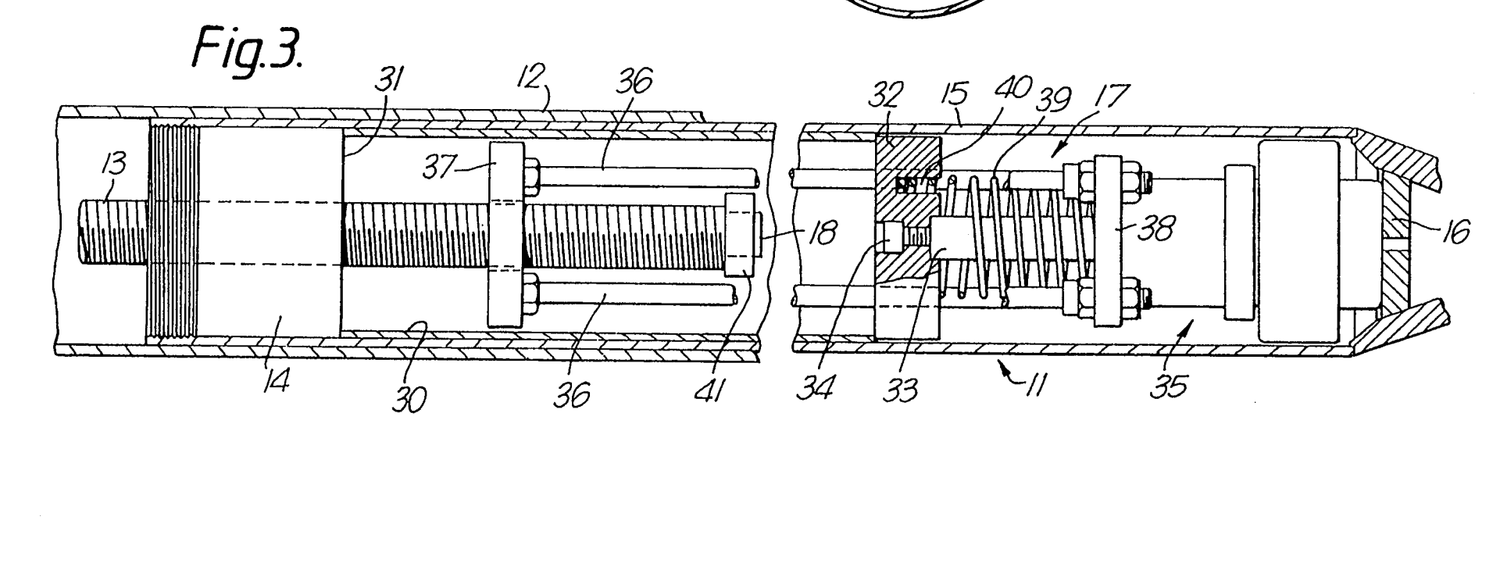
FIGS. 3 to 7 are views, similar to that of FIG. 1, of the preferred embodiment in different conditions, with FIGS. 1 and 7 illustrating two limits of translation of the travelling member relative to the driven member.

The travelling member 11 is shown on a larger scale in FIG. 3.

The travelling member 11 has, within the tubular member 15, a first spacing member in the form of an inner spacer tube 30 fitted to nest within the tubular member 15. One end of the spacer tube 30 butts against an annular face 31 of the nut 14. The other end of the spacer tube 30 butts against a face of an annular stop plate 32 secured to the external end of a piston rod 33 of the shock absorber unit 17 by a screw 34. The shock absorber unit 17 has a body portion 35 which, in FIGS. 1 and 3, is shown butting against the seating 16, the shock absorber unit being slightly compressed between the spacer tube 30 and the seating 16 in the condition illustrated by FIG. 3. Thus the first spacing member i.e. the tube 30, fixes a minimum distance of separation between the nut 14 and the shock absorber unit 17. The shock absorber unit 17 in this example is a hydraulic shock absorber of the kind giving controlled linear deceleration. The rod 33 is attached to a piston (not shown) within a cylinder chamber (not shown) with the body portion 35. Suitable shock absorbers of this type are manufactured by ACE Controls Inc., P.O. Box 71, Farmington, Mich. 48024, U.S.A.

The travelling member 11 also has within the tubular member 15 a second spacing member in the form of four rods 36 and a ring 37 with the rods 36 evenly disposed around the shaft 13 and attached at one end to the ring 37 and at the other end to a collar 38 secured to the body portion 35 of the shock absorber unit 17. Only two of the rods 36 are visible in the drawings. The ring 37 has an outer diameter allowing clearance from the inner surface of the spacer tube 30, and an inner diameter allowing clearance from the screw-threaded shaft 13. The ring 37 is held coaxial with the shaft 13 and the tube 30 by the rods 36. The rods 36 extend with clearance through respective bores through the stop plate 32.

The shock absorber unit 17 includes a restoring compression spring 39 located between the body portion 35 and the stop plate 32, where it is engaged in an annular groove 40 coaxial with the rod 33.

The shaft 13 has at its end 18 a stop member in the form of fixed collar 41 having an outer diameter sufficiently larger than the inner diameter of the ring 37 to ensure that the ring 37 cannot be pulled past the collar 41. Thus the second spacing member 36, 37, 38, fixes a maximum distance of separation, substantially equal to the length of the rods 36, between the end 18 of the shaft 13 and the body portion 35 of the shock absorber.

In FIG. 3, the nut 14 is shown in an intermediate position along the length of the shaft 13, and accordingly the shock absorber unit 17 is in its most relaxed condition, its body portion 35 being in contact with the seating 16, and the stop plate 32 being in contact with the spacer tube 30. In FIG. 1, although the body portion 35 is in contact with the seating 16, the stop plate 32 has been pushed away from the spacer tube 30 by the end 18 of the shaft 13.

Figure 4:
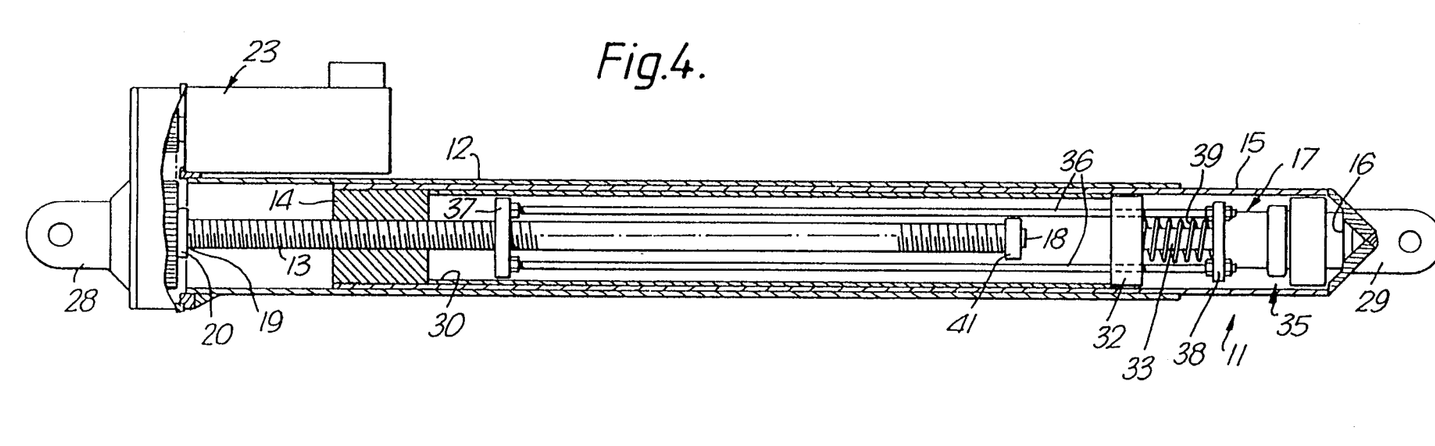

FIG. 4 shows the condition of the travelling member 11 when the nut 14 has travelled some distance away from its position of contact with the collar 20 shown in FIG. 1. It should be borne in mind that the distance between the nut 14 and the seating 16 is fixed by the tubular housing 15. As the nut 14 travels away from contact with the collar 20, the distance between the end 18 of the shaft 13 and the seating 16 increases, so that the rod 33 of the shock absorber unit 17 emerges from the body portion 35, the restoring spring 39 pushing the stop plate 32 away from the body portion 35 and, until the stop plate 32 butts against the spacer tube 30, holding the stop plate 32 against the end 18 of the shaft 13. FIG. 4 shows the relative positions of the shaft 13 and the elements of the travelling member 11 after the stop plate 32 has been caught by the spacer tube 30 and the nut 14 has travelled further away from the driven end 19 of the shaft 13.

The relative lengths of the tubular housing 15, the spacer tube 30, the shaft 13, and the free length of the piston rod 33 are such that the end 18 of the shaft 13 is just in contact with the stop plate 32, with the shock absorber 17 in its most relaxed condition and the spacer tube 30 holding the nut 14 and the stop plate 32 at the minimum distance apart, when the distance of separation between the collar 20 at the end 19 of the shaft 13 and the nut 14 is equal to the free length of the piston rod 33. The free length of the piston rod 33 is that part of its length which is free to move into and out of the body portion 35, i.e. the effective stroke length.

Figure 5:
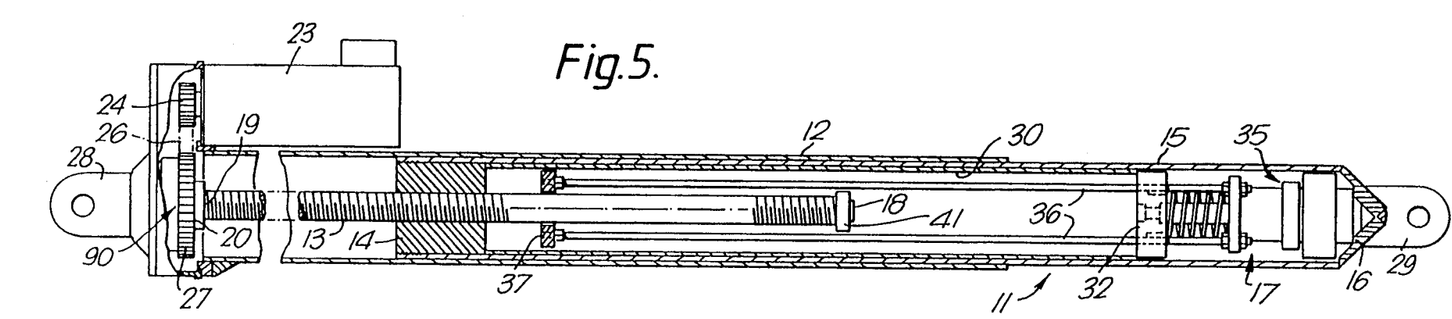

FIG. 5 shows the relative positions of the shaft 13 and the elements of the travelling member 11 in a further intermediate condition of the actuator 10 in which the nut 14 has travelled further away from the driven end 19 of the shaft 13 and closer to the end 18 of the shaft 13. The shock absorber unit 17 remains in its most relaxed condition, being held between the spacer tube 30 and the seating 16. It can be seen from FIGS. 1, 4, and 5, that with the body portion 35 of the shock absorber unit 17 in contact with the seating 16, the ring 37 is held at a fixed distance from the nut 14 by the rods 36. This fixed distance is also equal to the free length of the piston rod 33.

Figure 6:
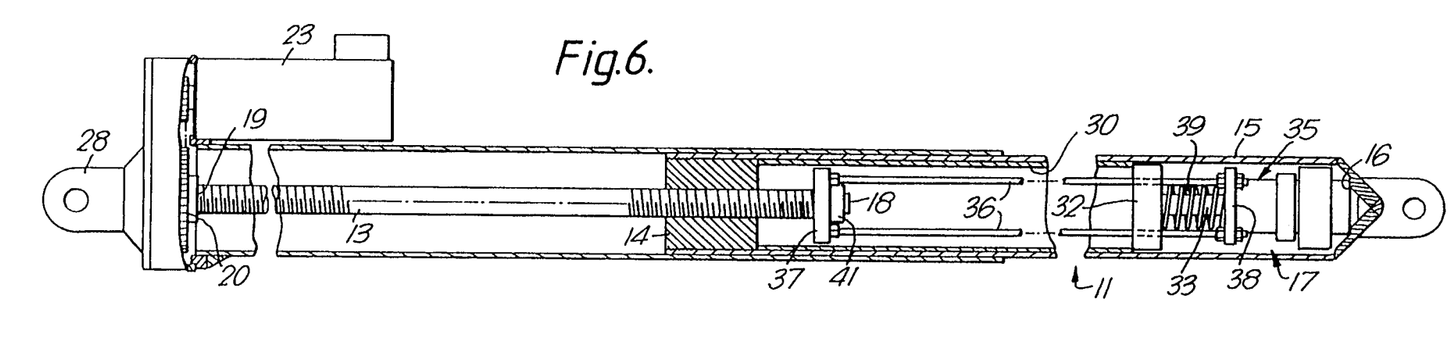

As the nut 14 moves closer to the end 18 of the shaft 13, it reaches a point at which the ring 37, which is carried along in front of the nut 14 by the body portion 35 pressed against the seating 16 by the spring 39 reacting against the spacer tube 30 through the stop plate 32, butts against the fixed collar 41 at the end 18 of the shaft 13. This point is illustrated by FIG. 6. The shock absorber unit 17 is in its most relaxed condition and its body portion is in contact with the seating 16.

Figure 7:
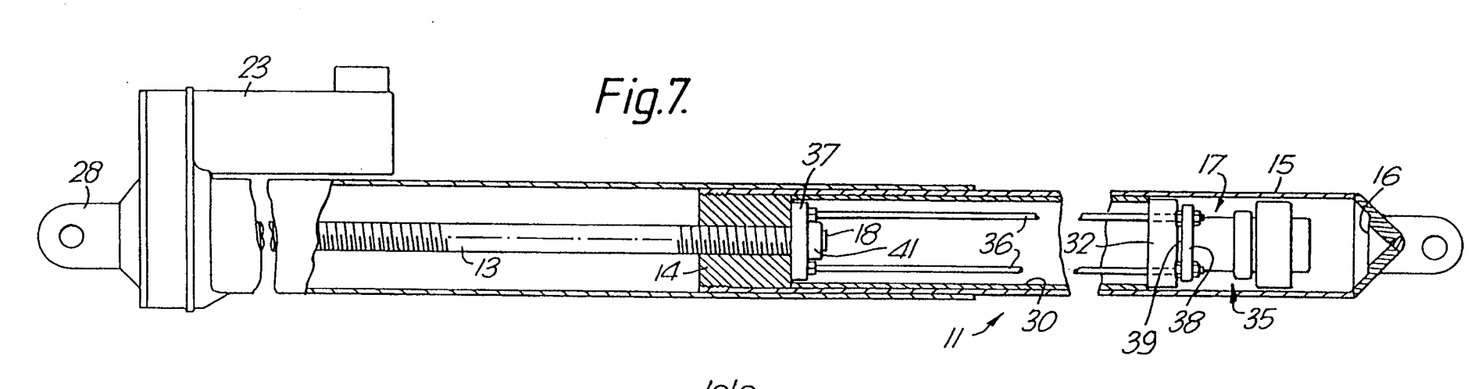

As the nut 14 travels further towards the end 18 of the shaft 13 from the position shown in FIG. 6, the distance of separation between the end 18 and the body portion 35 remains fixed at its maximum by the rods 36. The stop plate 32 is held fixed at its minimum distance from the nut 14 by the spacer tube 30, so that the decreasing distance between the nut 14 and the ring 37, now held fixed against the collar 41 by the spring 39, results in the distance between the stop plate 32 and the body portion 35 decreasing, so that the shock absorber unit 17 is compressed. Also, the seating 16 moves away from the body portion 35, the distance between the stop plate 32 and the seating 16 remaining at its maximum. The final limit position is shown in FIG. 7 where the nut 14 has come into contact with the ring 37 caught by the collar 41, and the shock absorber unit 17 is fully compressed.

Although in FIGS. 1 and 3-7 the nut 14 is represented as a solid body, the nut 14 is a roller nut, the shaft 13 and the nut 14 being a planetary roller screw unit of the kind manufactured by Fortune Engineering Limited under the trademark Spiracon.

Figure 8:
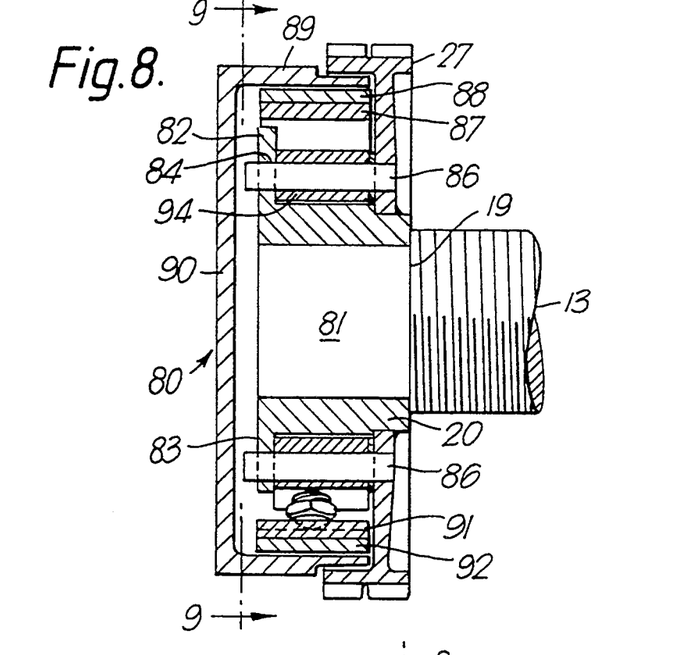
FIG. 8 is an axial sectional view of a centrifugal brake at one end of the driven member of the preferred embodiment of FIG. 1.
Figure 9:
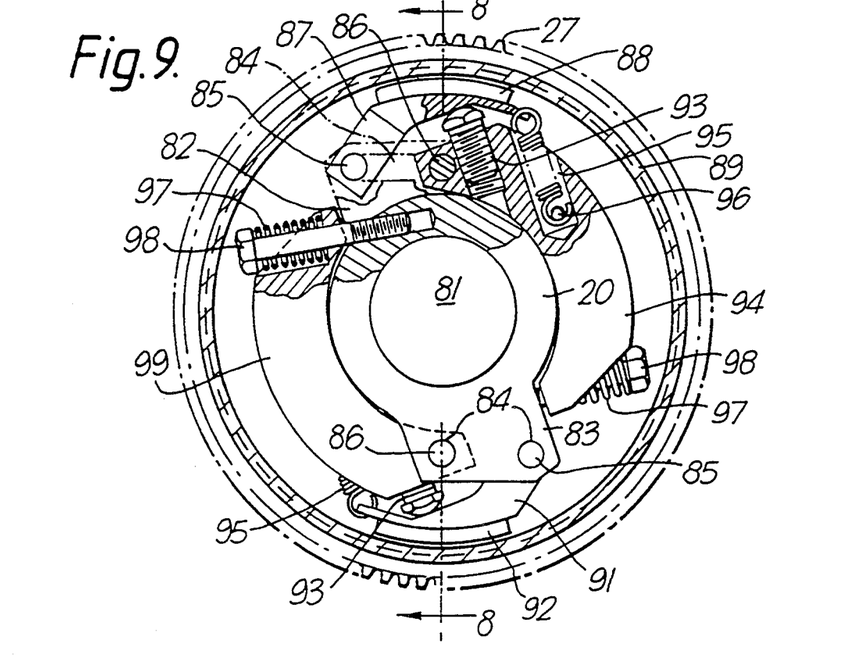
FIG. 9 is a radial sectional view of the centrifugal brake of FIG. 8 taken at the line 9—9 in FIG. 8.

FIG. 8 shows in an axial section, at the line 8—8 in FIG. 9, of a centrifugal brake 80 formed at the pulley 27 on the collar 20 fixed to the end 19 of the shaft 13.

The collar 20 is fixed on a reduced diameter portion 81 projecting from the end 19 of the shaft 13, and has two diametrically opposite lugs 82 and 83 projecting radially outwards flush with the outer end of the projecting portion 81. As can be seen from FIG. 9, each lug 82,83, has two bores 84 which respectively retain ends of two pivot pins 85 and 86 mounted in bores in the web of the pulley 27. The pins 85 and 86 may be prevented from moving axially by circlips (not shown) engaging grooves in the pins 85 and 86. The lug 82 is shown partly broken away in FIG. 9 to reveal a shoe member 87 pivotally mounted on the pin 85. The shoe member 87 has an arcuate pad 88 fixed thereto for frictional engagement with the inner surface of an annular wall 89 of a fixed cap member 90 secured (not shown) to the housing 23 (FIG. 1). A similar shoe member 91 with an arcuate pad 92 is pivotally mounted in the diametrically opposite position on the pivot pin 85 at the other lug 83.

The shoe member 87 is held against the head of a screw 93 engaged in a screw-threaded bore in a first weight member 94 by a tension spring 95 anchored by a pin 96 in a bore in the first weight member 94. The first weight member 94 is pivotally mounted on the pin 86 of the lug 82 and, when the rate of rotation of the pulley 27, collar 20, and shaft 13 is below a predetermined lower threshold rate, is held against a cylindrical outer surface of the collar 20 by a compression spring 97 on a bolt 98 extending with clearance through a bore (not shown) in the weight member 94 and threadedly engaged in a threaded bore (not shown) in the collar 20. The shoe member 91 is restrained in the same way by a second weight member 99 and corresponding springs and a respective screw and bolt which are given the same set of reference numerals. When the shoe members 87 and 91 are in contact with the heads of the screws 93 and the weight members 94 and 99 are in contact with the collar 20, the pads 88 and 92 are clear of the inner surface of the wall 89, as shown in FIGS. 8 and 9.

If the rate of rotation of the pulley 27, collar 20, and shaft 13 exceeds the predetermined lower threshold rate, the weight members 94 and 99 pivot, on the pins 86, out of contact with the collar 20. If the rate of rotation of the pulley, shaft 13, and collar 20 exceeds a predetermined higher threshold rate, the resulting pivoted positions of the weight members 94 and 99 are such that the pads 88 and 92 on the shoe members 87 and 91 come into contact with the inner surface of the wall 89 so that friction between the pads 88 and 92 and the wall 89 tends to slow down the rotation of the pulley 27, collar 20, and shaft 13 if rate of rotation exceeds the higher threshold.

To cut off the supply of power to the motors 21 and 22 when the nut 14 is within a certain short distance of each end 18 or 19 of the shaft 13, two limit switches 101 and 102 are mounted on the tubular housing 12 as shown in FIG. 1 and have roller-tipped plungers (not shown) extending through respective apertures (not shown) in the housing 12 to sense the position of the tubular member 15. The switches 101 and 102 are connected in a control circuit (not shown) that cuts off the supply to the motors 21 and 22 whenever both plungers are either fully retracted (FIG. 1) or fully extended (FIG. 7).

To sense the position of the securing lugs 29 relative to the open end of the tubular housing 12, an electromagnetic sensor 103 secured to the seating 16 holds a steel rod 104 parallel to the outer surface of the housing 12. The rod 104 is about the same length as the tubular member 15 and passes through an annular permanent magnet 105 attached to the open end of the housing 12. The sensor 103, rod 104, and magnet 105 may be a Temposonics (trade-mark) position sensing transducer 60070109 manufactured by M.T.S. Systems Corp of Research Triangle Park, N.C., U.S.A. Alternatively, a digital position resolver may be coupled to the driven end 19 of the shaft 13 to provide such position data.

The motors 21 and 22 are brushless D.C. servomotors with electronic drives (not shown). For each motor, electronic commutation is achieved by the use of a resolver (not shown) fitted to the motor shaft. The resolver Gives output signals that are proportional to the extension of the actuator 10 from its fully retracted condition (FIG. 1) and to its velocity of change of extension. The force exerted by the motor is proportional to the motor current and the magnitude of the motor current is used in a force-loop feedback servo-amplifier to control the motor. The motors 21 and 22 and their electronic drives are designed to carry the maximum intended load without overheating.

At the approach to a limiting condition (FIG. 1 or FIG. 7) of the actuator 10, the shock absorber unit 17 slows the travelling member 11 smoothly to a standstill.

If there is electrical power failure, or the supply to the motors 21 and 22 is for some other reason cut off, the load on the actuator 10 tends to backdrive the shaft 13 and the motors 21 and 22. In the absence of any braking, the load might backdrive the shaft 13 and motors 21 and 22 at a rapidly increasing rate and build up kinetic energy in the actuator 10 which might cause catastrophic damage at the end of the stroke. The centrifugal brake 80 is therefore designed and adjusted to begin engaging at a rate which is 10% above the normal maximum working rate, and to be fully engaged at 20% above the normal maximum working rate. The shock absorber unit 17 is designed to safely absorb the kinetic energy developed by operation at 20% above the normal maximum working rate.

The switches 101 and 102 are set to operate to cut off the supply to the motors 21 end 22 as soon as the shock absorber unit 17 begins to be compressed from its most relaxed condition, so that the motors 21 and 22 are prevented from continuing to drive the travelling member 11 towards a limit position (FIG. 1 or FIG. 7).

Referring again to FIG. 3, it will be seen that the shock absorber unit 17 has a first part 32, 33 and a second part 35 that are movable relative to each other and relative to the driven and travelling members 13 and 11 of the actuator 10. The seating 16 serves as a limiter for limiting the extent of movement of the shock absorber unit body portion 35 relative to the travelling member 11. The spacer tube 30 serves as a limiter for limiting the extent of movement of the stop plate 32 and rod 33 relative to the travelling member 11. The framework formed by the collar 38, rods 36, and ring 37 serves as a limiter means for limiting the extent of movement of the body portion 35 relative to the driven shaft 13, the framework being held captive on the shaft 13 by the collar 41. The extent of movement of the stop plate 32 and rod 33 relative to the shaft 13 is limited by the end 18 of the shaft 13.

When the body portion 35 is retained by the seating 16, the shock absorber unit 17 can be stressed by the end 18 of the shaft 13 as the nut 14 approaches the end 19.

When the body portion 35 is retained by the framework 36, 37, 38 engaging the collar 41, the shock absorber unit 17 can be stressed by the spacer tube 30 as the nut 14 approaches the end 18.

It will be appreciated that, with suitable modifications, an alternative embodiment can be constructed in which the nut 14 is the driven member and the shaft 13 is the travelling member, the drive being applied to the tubular member 15 instead of the shaft 13.

It will be apparent to those skilled in the art that the rotary drive applied to the shaft 13 as described is prevented from also rotating the nut 14 since the tubular member 15 is prevented from rotating by the fixing of the securing lugs to the load (not shown). Hence the tubular housing 12, the tubular member 15, and the nut 14 can all be of circular cross-section.

Figure 10:
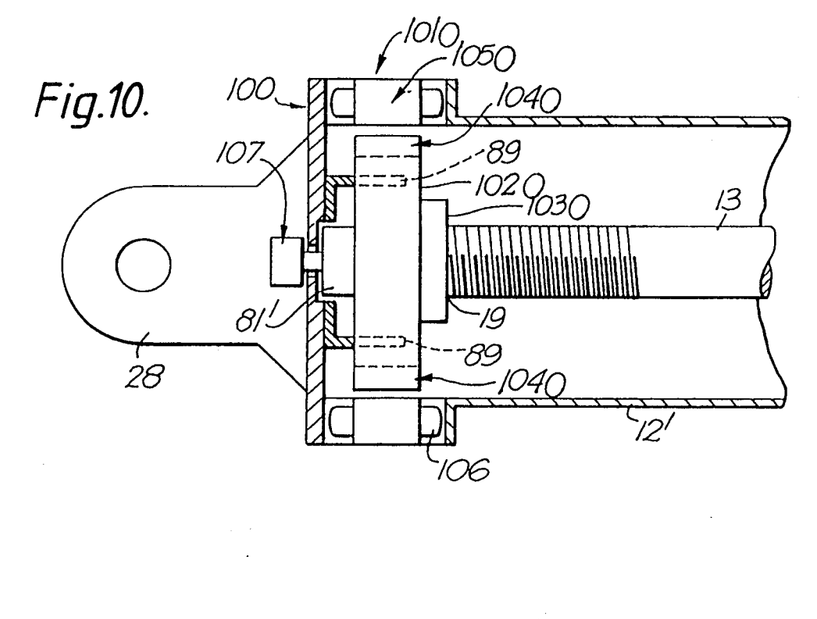
FIG. 10 is a schematic axial sectional view of a drive member of another preferred embodiment of the invention.

FIG. 10 shows part of an alternative embodiment which differs from that of FIGS. 1 to 9 in having a drive member that is coupled directly to a driven screw-threaded shaft 13. The cylindrical housing 12' ends at a cylindrical housing 100 of larger diameter than the housing 12' and containing an electric motor 1010 having a rotor 1020 with a hollow Shaft (not shown) fixed to a reduced diameter portion 81' projecting through a stop collar 1030 from the end 19 of the shaft 13. The rotor 1020 consists of a pulley shaped body, similar to the pulley 27, but having instead of radially outwardly directed gear teeth, ring of permanent magnets 1040, two of which are shown. A laminated ring-shaped stator 1050 surrounds the ring of permanent magnets 1040 and has a ring of stator coils 106, two of which are shown. The rotor 1020 contains centrifugal brake members (not shown) as described hereinbefore with reference to FIGS. 8 and 9, and a fixed annular wall 89 secured to the housing 100 extends into the rotor 1020 to be engaged by the brake shoes (not shown). A digital position resolver 107 is mounted to the housing 100 and driven by a mechanical connection from the extension 81' to provide signals for controlling the switching of current to the coils 106. The resolver 107 may further be adapted to provide position signals representing the position of the remote end of the travelling member (not shown), corresponding to the lugs 29 of FIGS. 4 to 7.

We claim:

1. An electrically powered actuator, comprising:
  a) bidirectional electrically powered drive member;
  b) a driven member coupled to the electrically powered drive member to be driven thereby;
  c) a travelling member engaged with the driven member and displaceable in opposite directions relative to the driven member between two limits of displacement
  d) a shock absorber unit disposed and coupled relative to the driven and travelling members to gradually slow down displacement of the travelling member relative to the driven member when the travelling member approaches each of said limits of displacement; said shock absorber unit including:
    1) first and second parts that are movable relative to each other and relative to the driven and travelling members;
    2) a limiter for limiting the extent of movement of said first and second parts relative to the driven member and relative to the travelling member, said limiter being coupled to the driven and travelling members such that the shock absorber unit is stressed by said limiter when the travelling member approaches each of said limits of displacement, said limiter including a first retainer for fixing a maximum distance of displacement between one of said driven and travelling members and said second part, and a second retainer for fixing a maximum distance of displacement between said second part and the other of the driven and travelling said members; and
  e) a centrifugal braking member for selectively restraining the driven member.

2. An electrically powered actuator comprising:
  a) a bidirectional electrically powered drive member;
  b) a driven member comprising a screw-threaded shaft coupled to the electrically powered drive member to be driven by the drive member;
  c) a travelling member engaged with the driven member and displaceable in opposite directions relative to the driven member between two limits of displacement, the travelling member including:
    1) a nut engaged with a thread of the screw-threaded shaft;
    2) a tubular member fixedly engaged at one end thereof with the nut and having a fixed seating member located at the other end thereof, the tubular member containing the shock absorber unit which is disposed in the tubular member such that the shock absorber unit is compressed between one end of the shaft and the fixed seating member when the nut is within less than a predetermined distance from the other end of the shaft;
  d) a shock absorber unit disposed and coupled relative to the driven and travelling members to gradually slow down displacement of the travelling member relative to the driven member when the travelling member approaches each of said limits of displacement; and
  e) a centrifugal braking member for selectively restraining the driven member.

3. An electrically powered actuator, comprising:
  a) a bidirectional electrically powered drive member;
  b) a driven member comprising a screw-threaded shaft coupled to the electrically powered drive member to be driven thereby;
  c) a travelling member comprising a roller nut engaged with a thread of the screw-threaded shaft of the driven member and displaceable in opposite directions relative to the driven member between two limits of displacement;
  d) a shock absorber unit disposed and coupled relative to the driven and travelling members to gradually slow down displacement of the travelling member relative to the driven member when the travelling member approaches each of said limits of displacement; and
  e) a centrifugal braking member for selectively restraining the driven member.

4. An electrically powered actuator, comprising:
  a) bidirectional electrically powered drive member;
  b) a driven member coupled to the electrically powered drive member to be driven thereby, said driven member being rotated by the drive member;
  c) a travelling member engaged with the driven member and displaceable in opposite directions relative to the driven member between two limits of displacement;
  d) a shock absorber unit disposed and coupled relative to the driven and travelling members to gradually slow down displacement of the travelling member relative to the driven member when the travelling member approaches each of said limits of displacement; the shock absorber unit including:
    1) first and second parts that are movable relative to each other and relative to the driven and travelling members;
    2) a limiter for limiting the extent of movement of said first and second parts relative to the driven member and relative to the travelling member, said limiter being coupled to the driven and travelling members such that the shock absorber unit is stressed by said limiter when the travelling member approaches each of said limits of displacement, said limiter including a first retainer for fixing a maximum distance of displacement between one of said driven and travelling members and said second part and a second retainer for fixing a maximum distance of displacement between said second part and the other of said driven and travelling members; and
  e) a centrifugal braking member coupled to said driven member to restrain rotation of said driven member above a predetermined rate of rotation thereof.

5. An actuator according to claim 4, wherein the first retainer comprises a seating member attached to said one of said driven and travelling members, and the second retainer comprises a framework attached to said second part and held on said other of said driven and travelling members.

6. An actuator according to claim 5, wherein said driven and travelling members are elongate and said other of said driven and travelling members is coaxially disposed with said one of said driven and travelling members, and the shock absorber unit is disposed between said seating member and one end of said other of the driven and travelling members.

7. An actuator according to claim 4, wherein the driven member includes a screw-threaded shaft, and the travelling member includes a nut engaged with a thread of the shaft.

8. An actuator according to claim 7, wherein the travelling member includes a tubular member fixedly engaged at one end thereof with the nut and having a seating member fixed at one end thereof, the shock absorber unit being disposed in the tubular member so that the shock absorber unit is compressed between one end of the shaft and a fixed seating member when the nut is within less than a predetermined distance from the other end of the shaft.

9. An actuator according to claim 8, wherein first and second spacers are provided within the tubular member for fixing a minimum distance of separation between the nut and the shock absorber unit, and for fixing a maximum distance of separation between said one end of the shaft and the shock absorber, the arrangement of the first and second spacers being such that the shock absorber unit is compressed between the first and second spacers when the distance between the nut and said one end of the shaft is less than a predetermined amount.

10. An actuator according to claim 9, wherein the first spacer comprises an inner tubular member located within said tubular member of said travelling member and disposed between the nut and the shock absorber unit, and the second spacer comprises a spacing member attached to a body portion of the shock absorber unit and extending to a ring encircling the shaft and engageable with a stop member on said one end of the shaft.

11. An actuator according to claim 7, wherein the nut is a roller nut.

12. An actuator according to claim 4, wherein the centrifugal braking member includes at least one weight member pivotally attached to the driven member and spring loaded to hold a brake shoe away from an encircling member fixed to a housing of the drive member, the spring loading being such that centrifugal movement of the weight member during rotation of the driven member allows the shoe to frictionally engage a surface of the encircling member when the rate of rotation is above said predetermined rate.

13. An actuator according to claim 4, wherein the travelling member is engaged with the driven member for displacement of the travelling member relative to the driven member in the form of translation.

14. An actuator according to claim 4, wherein the shock absorber unit linearly decelerates the travelling member relative to the driven member when the travelling member approaches each of said limits of displacement.

15. An actuator according to claim 4, wherein a cutoff member is provided for cutting off a supply of electric power to the drive member when the travelling member approaches each of the limits of displacement.

16. An actuator according to claim 4, wherein the drive member includes a rotary member and the driven member is coupled directly to the rotary member to rotate therewith in operation.

17. An electrically powered actuator, comprising:
a) a bidirectional electrically powered drive member;
b) a driven member coupled to the electrically powered drive member to be driven thereby, said driven member being rotated by the drive member;
c) a travelling member engaged with the driven member and displaceable in opposite directions relative to the driven member between two limits of displacement;
d) a shock absorber unit disposed and coupled relative to the driven and travelling members to gradually slow down displacement of the travelling member relative to the driven member when the travelling member approaches each of the limits of displacement; the shock absorber unit including:
1) first and second parts that are movable relative to each other and relative to the driven and travelling members;
2) a limiter for limiting the extent of movement of said first and second parts relative to the driven member and relative to the travelling member, said limiter being coupled to the driven and travelling members such that the shock absorber unit is stressed by said limiter when the travelling member approaches each of said limits of displacement, said limiter including a first retainer for fixing a maximum distance of displacement between one of said driven and travelling members and said second part and a second retainer for fixing a maximum distance of displacement between said second part and the other of said driven and travelling members, the first retainer comprising a seating member attached to said one of said driven and travelling members, the second retainer comprising a framework attached to said second part and held on said other Of said driven and travelling members, said driven and travelling members are elongate and said other of said driven and travelling members is coaxially disposed with said one of said driven and travelling members, and the shock absorber unit is disposed between said seating member and one end of said other of the driven and travelling members; and
e) a centrifugal braking member coupled to the driven member to restrain rotation of the driven member above a predetermined rate of rotation thereof, said centrifugal braking member including at least one weight member pivotally attached to the driven member and spring loaded to hold a brake shoe away from an encircling member fixed to a housing of the drive member, the spring loading being such that centrifugal movement of the weight member during rotation of the driven member allows the shoe to frictionally engage a surface of the encircling member when the rate of rotation is above said predetermined rate.

18. An actuator according to claim 17, wherein the travelling member is engaged with the driven member for displacement of the travelling member relative to the driven member in the form of translation, the shock absorber unit linearly decelerates the travelling member relative to the driven member when the travelling member approaches each of said limits of displacement, a cut-off member is provided for cutting off a supply of electric power to the drive member when the travelling member approaches each of said limits of displacement, and the drive member includes a rotary member, the driven member being coupled directly to the rotary member to rotate therewith in operation.

19. An actuator according to claim 17, wherein the driven member includes a screw-threaded shaft, the travelling member includes a roller nut engaged with a thread of the screw-threaded shaft and a tubular member fixedly engaged at one end thereof with the nut and having a fixed seating member located at the other end thereof, the tubular member containing the shock absorber unit which is disposed in the tubular member such that the shock absorber unit is compressed between one end of the shaft and the fixed seating member when the nut is within less than a predetermined distance from the other end of the shaft, first and second spacers being provided within the tubular member for fixing a minimum distance of separation between the nut and the shock absorber unit and for fixing a maximum distance of separation between said one end of the shaft and the shock absorber unit, the arrangement of said first and second spacers being such that the shock absorber unit is compressed between the first and second spacers when the distance between the nut and said one end of the shaft is less than a predetermined amount, the first spacer comprises an inner tubular member located within said tubular member of said travelling member and disposed between the nut and the shock absorber unit, and the second spacer comprises a spacing member attached to a body portion of the shock absorber unit and extending to a ring encircling the shaft and engageable with a stop member on said one end of the shaft.

20. An electrically powered actuator, comprising:
a) a bidirectional electrically powered drive member;
b) a driven member comprising a screw threaded shaft coupled to the electrically powered drive member to be driven thereby, said driven member being rotated by the drive member;
c) a travelling member engaged with the driven member and displaceable in opposite directions relative to the driven member between two limits of displacement, the travelling member including:
1) a roller nut engaged with a thread of the screw-threaded shaft;
2) a tubular member fixedly engaged at one end thereof with the nut and having a fixed seating member located at the other end thereof, the tubular member containing the shock absorber unit which is disposed in the tubular member such that the shock absorber unit is compressed between one end of the shaft and the fixed seating member when the nut is within less than a predetermined distance from the other end of the shaft;
3) first and second spacers provided within the tubular member for fixing a minimum distance of separation between the nut and the shock absorber unit, and for fixing a maximum distance of separation between said one end of the shaft and the shock absorber, the arrangement of said first and second spacers being such that the shock absorber unit is compressed between the first and second spacers when the distance between the nut and said one end of the shaft is less than a predetermined amount, the first spacer comprises an inner tubular member located within said tubular member of said travelling member and disposed between the nut and the shock absorber unit, and the second spacer comprises a spacing member body portion of the shock absorber unit and extending to a ring encircling the shaft and engageable with a stop member on said one end of the shaft;

d) a shock absorber unit disposed and coupled relative to the driven and travelling members to gradually slow down displacement of the travelling member relative to the driven member when the travelling member approaches each of said limits of displacement; and e) a centrifugal braking member coupled to the driven member to restrain rotation of the driven member above a predetermined rate of rotation thereof, said centrifugal braking member including at least one weight member pivotally attached to the driven member and spring loaded to hold a brake shoe away from an encircling member fixed to a housing of the drive member, the spring loading being such that centrifugal movement of the weight member during rotation of the driven member allows the shoe to frictionally engage a surface of the encircling member when the rate of rotation is above said predetermined rate.

21. An electrically powered actuator, comprising:
a) a bidirectional electrically powered drive member;
b) a driven member coupled to the electrically powered drive member to be driven thereby;
c) a travelling member engaged with the driven member and displaceable in opposite directions relative to the driven member between two limits of displacement;
d) a shock absorber unit having first and second parts that are movable towards and away from each other and relative to the driven and travelling members;
e) a limiter for limiting the extent of movement of said first and second parts relative to the driven member and relative to the travelling member, said limiter being coupled to the driven and travelling members such that the shock absorber unit is compressed by said limiter when the travelling member approaches each of said limits of displacement, whereby said shock absorber unit is disposed and coupled relative to the driven and travelling members to gradually slow down displacement of the travelling member relative to the driven member when the travelling member approaches each of said limits of displacement; and
f) a centrifugal braking member for selectively restraining the driven member.

22. An actuator according to claim 21, wherein, in operation, the driven member is rotated by the drive member, and the centrifugal braking means is coupled to the driven member to restrain rotation of the driven member above a predetermined rate of rotation thereof.

23. An actuator according to claim 22, wherein the centrifugal braking member includes at least one weight member pivotally attached to the driven member and spring loaded to hold a brake shoe away from an encircling member fixed to a housing of the drive member, the spring loading being such that centrifugal movement of the weight member during rotation of the driven member allows the shoe to frictionally engage a surface of the encircling member when the rate of rotation is above said predetermined rate.

24. An actuator according to claim 21, wherein the driven member includes a screw-threaded shaft, and the travelling member includes a nut engaged with a thread of the shaft.

25. An actuator according to claim 24, wherein the travelling member includes a tubular member fixedly engaged at one end thereof with the nut and having a fixed seating member located at the other end thereof, the tubular member containing the shock absorber unit which is disposed in the tubular member such that the shock absorber unit is compressed between one end of the shaft and the fixed seating member when the nut is within less than a predetermined distance from the other end of the shaft.

26. An actuator according to claim 25, wherein first and second spacers are provided within the tubular member for fixing a minimum distance of separation between the nut and the shock absorber unit, and for fixing a maximum distance of separation between said one end of the shaft and the shock absorber, the arrangement of said first and second spacers being such that the shock absorber unit is compressed between the first and second spacers when the distance between the nut and said one end of the shaft is less than a predetermined amount.

27. An actuator according to claim 26, wherein the first spacer comprises an inner tubular member located within said tubular member of said travelling member and disposed between the nut and the shock absorber unit, and the second spacer comprises a spacing member attached to a body portion of the shock absorber unit and extending to a ring encircling the shaft and engageable with a stop member on said one end of the shaft.

28. An actuator according to claim 24, wherein the nut is a roller nut.

29. An actuator according to claim 21, wherein said limiter includes a first retainer for fixing a maximum distance of displacement between one of said driven and travelling members and said second part, and a second retainer for fixing a maximum distance of displacement between said second part and the other of the said driven and travelling members.

30. An actuator according to claim 29, wherein the first retainer comprises a seating member attached to said one of said driven and travelling members, and the second retainer comprises a framework attached to said second part and held on said other of said driven and travelling members.

31. An actuator according to claim 30, wherein said driven and travelling members are elongate and said other of said driven and travelling members is coaxially disposed with said one of said driven and travelling members, and the shock absorber unit is disposed between said seating member and one end of said other of the driven and traveling members.

32. An actuator according to claim 21, wherein the travelling member is engaged with the driven member for displacement of the travelling member relative to the driven member in the form of translation.

33. An actuator according to claim 21, wherein the shock absorber unit linearly decelerates the travelling member relative to the driven member when the travelling member approaches each of said limits of displacement.

34. An actuator according to claim 21, wherein a cut-off member is provided for cutting off a supply of electric power to the drive member when the travelling member approaches each of said limits of displacement.

35. An actuator according to claim 21, wherein the drive member includes a rotary member and the driven member is coupled directly to the rotary member to rotate therewith in operation.

* * * * *